United States Patent [19]

Williamson et al.

[11] Patent Number: 5,329,214

[45] Date of Patent: Jul. 12, 1994

[54] MOTOR DRIVE CIRCUIT

[75] Inventors: Ralph K. Williamson, Spring; Michael J. Dougherty, Houston; Phillip M. O'Hara, Tomball, all of Tex.

[73] Assignee: Compaq Computer Corporation, Houston, Tex.

[21] Appl. No.: 937,967

[22] Filed: Aug. 28, 1992

[51] Int. Cl.$^5$ .......................... H02P 7/00; H02P 7/67
[52] U.S. Cl. .................................................. 318/434
[58] Field of Search ............... 318/264, 265, 266, 280, 318/286, 430, 431, 432, 433, 434, 466, 467, 468, 469; 361/23, 31

[56] References Cited

U.S. PATENT DOCUMENTS

| | | | |
|---|---|---|---|
| 3,777,240 | 12/1973 | Neill | 318/471 |
| 4,234,836 | 11/1980 | Gaus et al. | 318/480 |
| 4,371,824 | 2/1983 | Gritter | 318/722 |
| 4,680,513 | 7/1987 | Kennedy | 318/285 |
| 4,809,122 | 2/1989 | Fitzner | 318/434 X |

Primary Examiner—Bentsu Ro
Attorney, Agent, or Firm—Konneker Bush Hitt & Chwang

[57] ABSTRACT

To improve the reliability and lower the cost of electronic control circuits for direct current (DC) motors, the need for external mechanical sensors is eliminated through the use of low cost, highly reliable voltage comparator circuits. A motor driver integrated circuit provides for electronic storage of data, automatic execution of computer programs, and input/output transfer of various electronic signals used in the control of the DC motor. The voltage comparator circuits sense the operating state of the DC motor by comparing the motor current sense voltage, which is proportional to the torque of the motor, to threshold fixed reference voltages to determine whether the DC motor is running normally or is stalled. The motor driver IC stops or reverses the DC motor when it is stalled, thereby preventing damage and providing for fully automatic operation without external sensors.

8 Claims, 2 Drawing Sheets 6,329,214

MOTOR DRIVE CIRCUIT

BACKGROUND OF THE INVENTION

1. Field of the Invention

This invention relates to electronic monitoring and control circuits. More particularly, this invention relates to electronic drive circuits used to monitor and control direct current (DC) motors.

2. Description of Related Art:

DC motors are used in many applications to move machines or position parts of machines with respect to each other. Many of the existing applications use electronic drive circuits to control the DC motor. A problem in any such circuit is determining when the machine or part being moved has reached the end of its travel, so that the electric current driving the DC motor can be eliminated or reversed to stop the motor or reverse its direction, thereby preventing damage to the DC motor or machine.

All such control circuits in the past have relied on mechanical sensors external to the control circuit to sense when the moving machine or part has reached the end of its travel, and to cut off or reverse the electrical current to the DC motor. For example, a switch would be mounted at the end of a rail along which the machine or part is moved. When the machine or part contacts the switch, the switch either creates an open circuit which eliminates the current and stops the motor, or the switch reverses the polarity of the current and reverses the motor direction. Optical sensors, wherein the moving part breaks a beam of light, have also been used to perform the function of the switch.

The use of external mechanical sensors, however, adds greater complexity and cost to DC-motor control systems. This complexity results in higher cost of production, reduced reliability, and therefore, higher maintenance costs over the life of the systems.

SUMMARY OF THE INVENTION

It is an object of the present invention to eliminate the need for external mechanical sensors in DC motor control circuits. The invention is a totally electronic drive circuit which provides the desired control of DC motors without external sensors. A motor driver integrated circuit provides for electronic storage of data, automatic execution of computer programs, and input/output transfer of various electronic signals used in the control of the DC motor. Highly reliable, low cost voltage comparator circuits are used to sense the operating state of the DC motor. The comparator circuits replace external switches and optical sensors of relatively high cost and low reliability. The invention thereby provides greater reliability, greatly reduced production cost, and reduced cost of ownership over the life of the circuit.

The voltage comparator circuits compare the motor current sense voltage, which is proportional to the torque of the DC motor, to threshold fixed reference voltages to determine whether the DC motor is operating normally or is stalled. The motor driver IC will stop or reverse the DC motor when it is stalled, thereby preventing damage and providing for fully automatic operation without external sensors.

The electronic drive circuit comprises a motor driver integrated circuit for electronic storage of data, for automatic execution of computer programs, and for input/output transfer of various electronic signals used in the control of DC motors. The electronic drive circuit further comprises means for determining the motor current sense voltage of the DC motor, means for determining a first threshold fixed reference voltage which the motor current sense voltage will exceed when the DC motor is operating normally, and a low voltage comparator circuit for comparing the motor current sense voltage when the DC motor is operating normally to the first threshold fixed reference voltage. The electronic drive circuit also comprises means for determining a second threshold fixed reference voltage which the motor current sense voltage will exceed when the DC motor is stalled, and a high voltage comparator circuit for comparing the motor current sense voltage when the DC motor is stalled to the second threshold fixed reference voltage.

In one embodiment, the electronic drive circuit is used in a printer to control a DC motor which moves a paper pusher from one location to another.

In another sense the present invention is a method of controlling a DC motor comprising the steps of measuring the motor current sense voltage of the DC motor, determining a first threshold fixed reference voltage which the motor current sense voltage will exceed when the DC motor is operating normally, determining a second threshold fixed reference voltage which the motor current sense voltage will exceed when the DC motor is stalled, comparing the motor current sense voltage to the first and second threshold fixed reference voltages to determine whether the DC motor is operating normally or is stalled, and finally, eliminating the current to the DC motor when the DC motor is stalled.

BRIEF DESCRIPTION OF THE DRAWINGS

For a more complete understanding of the present invention, and for further objects and advantages thereof, reference may now be had to the following detailed description of the invention taken in conjunction with the accompanying drawings wherein.

DETAILED DESCRIPTION

The following detailed description is to be clearly understood as being given by way of illustration and example only, the spirit and scope of the present invention being limited solely by the appended claims.

Figure 1:
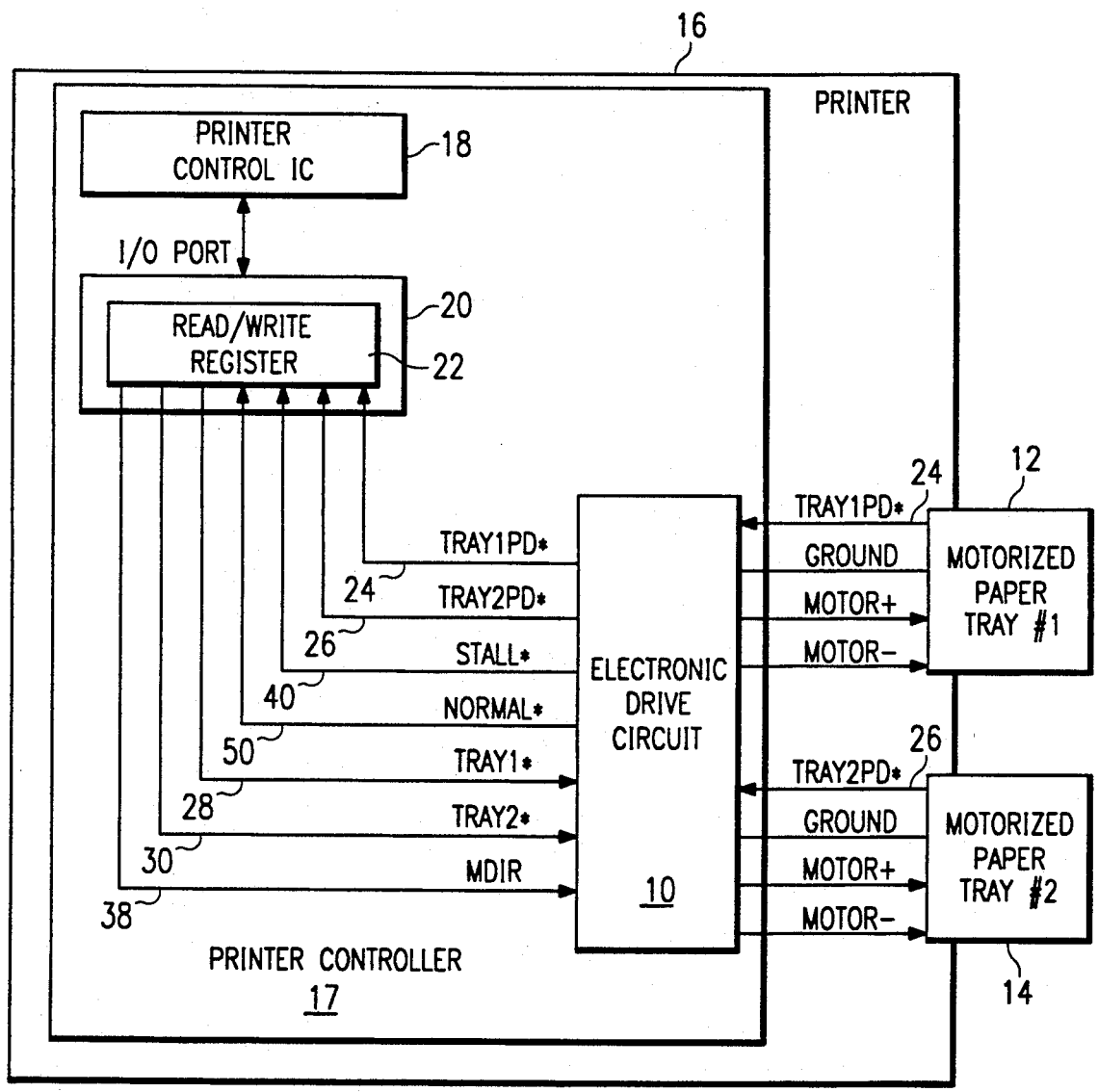
FIG. 1 is a block diagram of a printer embodying principles of the present invention.

FIG. 1 shows a block diagram of a preferred embodiment utilizing an electronic drive circuit 10 in a printer controller 17 to control a DC motor (not shown) in motorized paper tray #1 12 and motorized paper tray #2 14 used in a printer 16. Each DC motor moves a pusher (not shown) which pushes a stack of paper from one location to another, and then moves the pusher back to its home location. In FIG. 1 the printer controller 17 may be seen to include a printer control integrated circuit (printer control IC) 18, a standard input/output port 20, and a readable/writable register 22, as well as the electronic drive circuit 10. The printer control IC 18 may be any suitable microprocessor, for example, a 29K microprocessor. The printer control IC 18 is connected via the input/output port 20 to the readable/writable register 22. Signals TRAY1PD* 24 and TRAY2PD* 26 indicate to the printer which of the motorized paper trays is present. For motorized paper tray #1 12, the signal TRAY1PD* 24 is sent to the readable/writable register 22 and through the input/output port 20 to the printer control IC 18. The printer control IC 18 controls the signal TRAY1* 28 by writing a digital value to the register 22 which asserts or de-asserts the signal TRAY1* 28 as low or high. When a signal inside the printer 16 indicates that the paper supply is empty, the printer control IC 18 writes a digital value to the register 22 which asserts the signal TRAY1* 28 as low. When the paper supply is not empty, the printer control IC 18 writes a digital value to the register 22 which de-asserts the signal TRAY1* 28 as high. The same process is used for motorized paper tray #2 14 to generate a signal TRAY2* 30 and assert it as high or low. The signals TRAY1* 28 and TRAY2* 30 are sent to the electronic drive circuit 10. When either TRAY1* 28 or TRAY2* 30 is logically asserted low, the electronic drive circuit 10 drives the DC motor as further described below.

Figure 2:
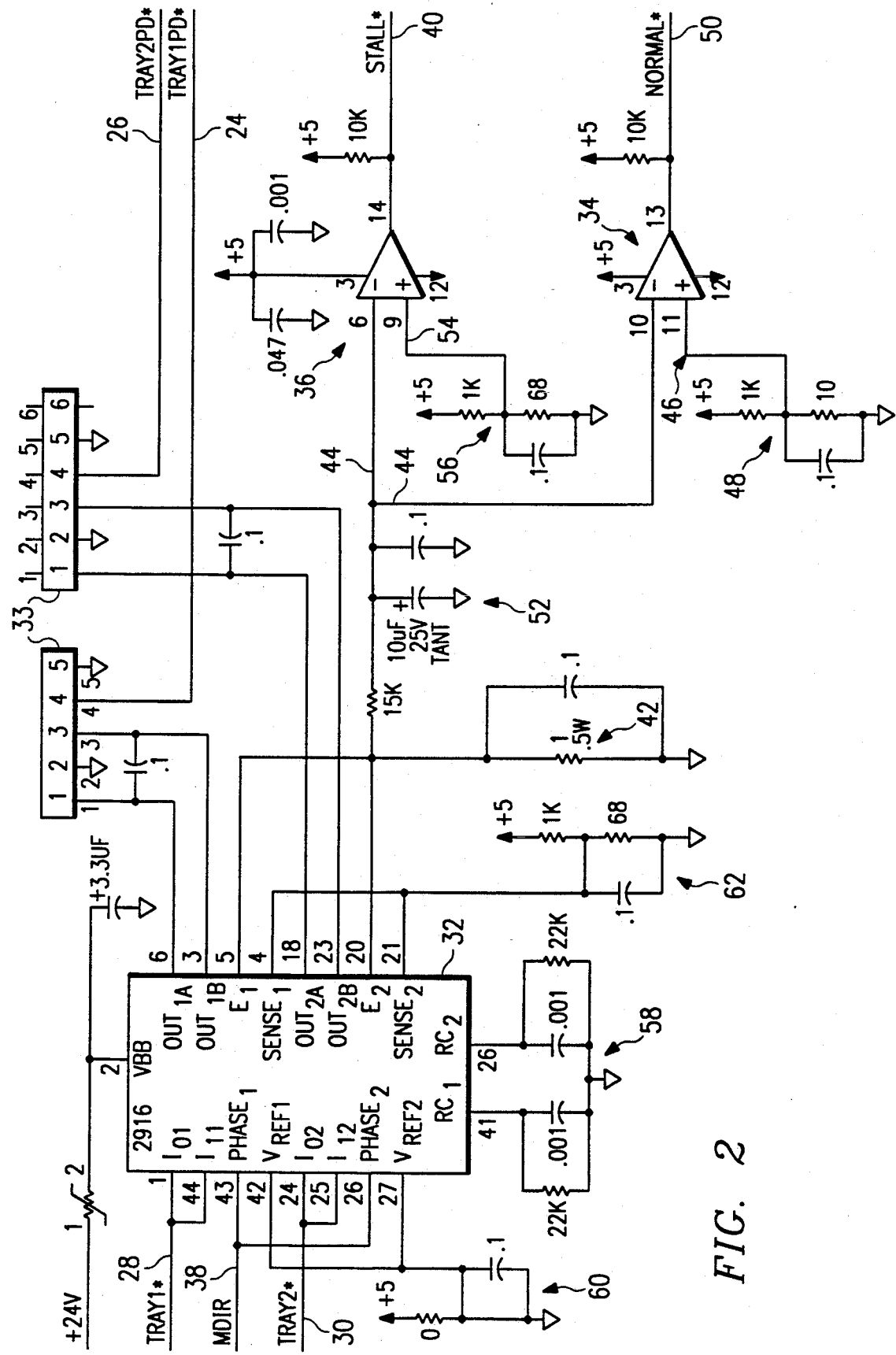
FIG. 2 is a schematic of the electronic drive circuit.

The electronic drive circuit 10 is shown in greater detail in FIG. 2. The electronic drive circuit 10 uses a dual bridge, pulse width modulation, motor driver integrated circuit (motor driver IC) 32 to drive the DC motor. The motor driver IC 32 may drive both windings of a bipolar stepper motor or bidirectionally control two DC motors. Signals from the electronic drive circuit 10 to and from the motorized paper trays 12 and 14 pass through the motor connectors 33. A low voltage comparator circuit (normal comparator) 34 and a high voltage comparator circuit (stall comparator) 36 sense the operating state of the DC motor (i.e. whether operating normally, or stalled), and send this information to the input/output port 20. There is no requirement for external switches or optical sensors to determine when the paper pusher has reached either end of travel.

When either signal TRAY1* 28 or TRAY2* 30 is logically asserted low, the motor driver IC 32 starts the DC motor running and thereby moves the paper pusher from its home location to the far end of its travel. The direction of motor operation is determined by the logical state of a signal MDIR 38. The printer control IC 18 writes a digital value to the input/output port 20 which generates the signal MDIR 38. The register 22 then asserts or de-asserts the signal MDIR 38 as low or high. The printer control IC 18 determines the proper state of signal MDIR 38 by performing a homing function when either paper tray #1 12 or paper tray #2 14 is first inserted into the printer 16. The printer control IC 18 signals the motor driver IC 32 to start the DC motor and reverse its direction until the input/output port 20 senses from the stall comparator 36 that the DC motor has stalled. The input/output port 20 then signals the motor driver IC 32 to stop the DC motor. The printer control IC 18 reads the register 22 and determines from the value of the stall signal that the home position has been reached, and records the position of stall as the home position for the paper pusher. When the printer control IC 18 receives a signal generated by a sensor (not shown), indicating an empty paper tray #1 12 or paper tray #2 14, the printer control IC 18 signals the motor driver IC 32 to turn the DC motor in the forward direction until the paper pusher reaches the far end of its travel.

When the paper pusher reaches the far end of its travel, the DC motor stalls. The stall comparator 36 signals this condition to the input/output port 20 with the signal STALL* 40. A more detailed description of the generation of the signals STALL* 40 and NORMAL* 50 follows below. The input/output port 20 recognizes that the paper pusher is at the far end of its travel because of the previously performed homing function, and therefore, signals the motor driver IC 32 to reverse the DC motor direction and return the pusher to its home position. Upon reaching the home position, the DC motor once again stalls. The stall comparator 36 signals this condition to the input/output port 20 which recognizes this position as the home position and signals the motor driver IC 32 to stop the DC motor.

The normal comparator 34 and the stall comparator 36 determine the operating condition of the DC motor by comparing the motor current sense voltage to two reference voltages which indicate whether the DC motor is operating normally or is stalled. The current through the DC motor is proportional to the torque produced by the motor. The running motor current returns to ground through the motor current sense resistor circuit 42. This is a one-Ohm resistor which produces a voltage across the resistor 42, referred to as the motor current sense voltage 44, equal in millivolts to the current in milliamps flowing through the motor windings. The torque produced by the DC motor rises significantly when the DC motor transitions from a normal condition to a stalled condition when the pusher reaches either end of travel. This increase in torque causes corresponding increases in the current through the DC motor and in the motor current sense voltage 44.

When the paper pusher is in motion, the DC motor is operating normally with a nominal motor current sense voltage 44 of 150 millivolts. Normal comparator 34 compares the motor current sense voltage 44 to a first threshold fixed reference voltage (normal reference) 46 of 50 millivolts produced by the normal reference sub-circuit 48. If the motor current sense voltage 44 is above 50 millivolts, the normal comparator 34 sends the signal NORMAL* 50 to the readable/writable register 22 and the printer control IC 18. This gives an indication to the printer control IC 18 that the DC motor is operating normally. The motor driver IC 32 therefore is allowed to continue to drive the DC motor.

When the paper pusher reaches the far end of its travel, and the paper is in its new position, the DC motor enters a stalled condition. The current in the DC motor rises to the full rated current of 700 milliamps when the DC motor is in a stalled condition. A low pass filter 52, however, causes the motor current sense voltage 44 at the stall comparator 36 to rise exponentially, passing 318 millivolts in approximately 100 milliseconds. The stall comparator 36 compares the motor current sense voltage 44 to a second threshold fixed reference voltage (stall reference) of 318 millivolts produced by the stall reference sub-circuit 56. When the motor current sense voltage 44 rises above 318 millivolts, the stall comparator 36 sends the signal STALL* 40 to the readable/writable register 22 and the printer control IC 18. The input/output port 20 then signals the motor driver IC 32 to stop or reverse the DC motor to prevent any damage.

The purpose of the low pass filter 52 is to distinguish between start-up inrush current and stall current in the DC motor. Start-up inrush current is of very short duration, approximately 50 milliseconds. Stall is allowed to last about twice as long. Because of the difference in start-up and stall waveshapes, the motor current sense voltage 44 only rises approximately 30 millivolts during the short duration of inrush current. Therefore, the output of the low pass filter 52 gives an approximately 10:1 start-up voltage level rejection margin.

FIG. 2 also contains an oscillator sub-circuit 58, reference voltage sub-circuit 60, and reference voltage sub-circuit 62. These sub-circuits support operation of the motor driver IC 32.

Obviously, numerous modifications and variations are possible in view of the teachings above. Accordingly, within the scope of the present invention, the present invention may be practiced otherwise than as specifically described hereinabove.

What is claimed is:

1. An electronic drive circuit for monitoring and controlling a direct current (DC) motor using a high voltage comparator circuit and a low voltage comparator circuit to sense an operating state of said DC motor, comprising:

means for electronic storage of data, for automatic execution of computer programs, and for input/output transfer of various electronic signals used for control of said DC motor, said means comprising a motor drive integrated circuit;

means for electronically connected said motor driver integrated circuit to said high voltage comparator circuit, said low voltage comparator circuit and said DC motor;

means for determining a motor current sense voltage of said DC motor;

means for determining a first threshold fixed reference voltage which said motor current sense voltage will exceed when said DC motor is operating normally;

means for comparing said motor current sense voltage when said DC motor is operating normally to said first threshold fixed reference voltage, said means comprising said low voltage comparator circuit;

means for determining a second threshold fixed reference voltage which said motor current sense voltage will exceed when said DC motor is stalled;

means for comparing said motor current sense voltage when said DC motor is stalled to said second threshold fixed reference voltage, said means comprising said high voltage comparator circuit; and means for relieving excess torque of said DC motor in response to said motor current sense voltage exceeding said second threshold fixed reference voltage.

2. The electronic drive circuit of claim 1 wherein said motor driver integrated circuit is a dual, fullbridge, pulse width modulation motor driver.

3. The electronic drive circuit of claim 2 wherein said electronic drive circuit is used to drive both windings of a bipolar stepper motor.

4. The electronic drive circuit of claim 3 wherein said electronic drive circuit is used in a printer to move a paper pusher from one location to another.

5. The electronic drive circuit of claim 2 wherein said electronic drive circuit is used to bidirectionally control two DC motors.

6. The electronic drive circuit of claim 5 wherein said electronic drive circuit is used in a printer to move two paper pushers from one location to another.

7. An electronic drive circuit for monitoring and controlling a direct current (DC) motor, comprising:

means for determining a motor current sense voltage for said DC motor;

a motor driver integrated circuit, said motor driver integrated circuit including means for electronic storage of data, for automatic execution of computer programs, and for input/output transfer of various electronic signals used for control of said DC motor;

a low voltage comparator circuit electrically connected to said motor driver integrated circuit, said low voltage comparator circuit comparing said motor current sense voltage to a first threshold fixed reference voltage, said motor current sense voltage exceeding said first threshold fixed reference voltage when said DC motor is operating normally;

a high voltage comparator circuit electrically connected to said motor driver integrated circuit, said high voltage comparator circuit comparing said motor current sense voltage to a second threshold fixed reference voltage, said motor current sense voltage exceeding said second threshold fixed reference voltage when said DC motor is stalled; and means for relieving excess torque of said DC motor in response to said motor current sense voltage exceeding said second threshold fixed reference voltage.

8. An electronic drive circuit for monitoring and controlling a direct current (DC) motor, comprising:

a motor driver integrated circuit, said motor driver integrated circuit including means for electronic storage of data, for automatic execution of computer programs, and for input/output transfer of various electronic signals used for control of said DC motor;

a motor voltage sensing circuit electrically connected to said motor driver integrated circuit, said motor voltage sensing circuit determining an operating voltage for said DC motor;

a first voltage comparator circuit electrically connected to said motor driver integrated circuit, said first voltage comparator circuit comparing said operating voltage to a first threshold voltage, said operating voltage exceeding said first threshold voltage when said DC motor is operating in a first state;

a second voltage comparator circuit electrically connected to said motor driver integrated circuit, said second voltage comparator circuit comparing said operating voltage to a second threshold voltage, said operating voltage exceeding said second threshold voltage when said DC motor is operating in a second state; and means for modifying operating of said DC motor in response to said operating voltage exceeding said second threshold voltage.

* * * * *